United States Patent
Muniraju et al.

(10) Patent No.: US 7,289,924 B2
(45) Date of Patent: Oct. 30, 2007

(54) SELF-CALIBRATING SENSOR

(75) Inventors: Raghavendra Muniraju, Bangalore (IN); Sudheer Pulikkara Veedu, Bangalore (IN); James L. Blackstone, Rockwall, TX (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/185,036

(22) Filed: Jul. 20, 2005

(65) Prior Publication Data

US 2007/0032974 A1 Feb. 8, 2007

(51) Int. Cl.
G01R 35/00 (2006.01)

(52) U.S. Cl. .................................... 702/107

(58) Field of Classification Search ............... 702/107; 250/559.1
See application file for complete search history.

(56) References Cited

U.S. PATENT DOCUMENTS

| | | | |
|---|---|---|---|
| 3,196,255 A | 7/1965 | Beauchamp et al. | 219/497 |
| 4,097,732 A | 6/1978 | Krause et al. | |
| 4,703,251 A * | 10/1987 | Baumgartner et al. | 324/617 |
| 5,112,455 A | 5/1992 | Cozzette et al. | 204/153.12 |
| 5,121,064 A * | 6/1992 | Eller | 324/601 |
| 5,365,420 A | 11/1994 | Cadman | 363/50 |
| 5,479,096 A | 12/1995 | Szczyrbak et al. | |
| 5,502,312 A * | 3/1996 | Lorenzo | 250/559.1 |
| 5,532,584 A * | 7/1996 | Jeffers et al. | 324/202 |
| 5,635,704 A * | 6/1997 | Del Signore et al. | 250/205 |
| 5,841,318 A | 11/1998 | Cram | 330/9 |
| 5,889,883 A * | 3/1999 | Simpkins | 382/135 |
| 5,943,388 A | 8/1999 | Tumer | 378/98.9 |
| 6,208,414 B1 | 3/2001 | Killpatrick et al. | 356/350 |
| 6,246,831 B1 | 6/2001 | Seitz et al. | 392/486 |
| 6,374,191 B1 * | 4/2002 | Tsuchiya et al. | 702/104 |
| 6,606,171 B1 | 8/2003 | Renk et al. | 358/475 |
| 6,622,286 B1 | 9/2003 | Ngo et al. | 716/1 |
| 6,691,055 B2 * | 2/2004 | Walter et al. | 702/107 |
| 7,006,938 B2 * | 2/2006 | Laraia et al. | 702/104 |
| 2004/0070495 A1 | 4/2004 | Chu et al. | |
| 2004/0254756 A1 | 12/2004 | Strittmatter | 702/117 |

FOREIGN PATENT DOCUMENTS

WO WO2004011897 A1 5/2004

* cited by examiner

Primary Examiner—John Barlow
Assistant Examiner—Jonathan Moffat
(74) Attorney, Agent, or Firm—Matthew F. Lambrinos; Kermit D. Lopez; Luis M. Ortiz

(57) ABSTRACT

A method for self-calibrating a sensor can be implemented in a system having a calibration circuit. The calibration circuit has differential circuitry which compares an output signal of the sensor with a predetermined reference signal associated with a reference property. A bias controller increments or decrements the sensor operating bias according to the deviation between the predetermined reference signals and sensor output signal such that the sensor output corresponds to the predetermined reference voltage. The calibration circuit can be embedded in the sensor to provide a self-calibrating sensor. Logic circuitry can be used to form the calibration circuit.

17 Claims, 4 Drawing Sheets

SELF-CALIBRATING SENSOR

TECHNICAL FIELD

Embodiments relate to sensor calibration and, more particularly, to systems and methods of self-calibrating sensors. Embodiments also relate to self-calibrating sensors, such as, infra-red (IR), Hall-Effect, Magneto-Resistive and piezo-resistive pressure self-calibrating sensors.

BACKGROUND OF THE INVENTION

Sensors are employed in a whole range of technological applications including automotive, medical and printing applications to name a few. Such applications require sensors which can operate reliably and reproducible according to specified performance characteristics. For this reason, sensors are normally individually calibrated during production to offset minor deviations in sensor performance resulting from mass production techniques ensuring that measurements can be performed accurately for each and every sensor produced.

Performance of an electronic sensor is dependent on the transducer/material properties and the biasing current or voltage. For example, in the case of infra red (IR) sensors, which have an IR light emitting diode (LED) and an IR detector, the beam intensity from the LED is affected by the forward current (IF), aging of the LED, dust accumulating on the sensor and other factors. Consequently, the actual detected beam intensity for a given reference sensing environment can vary from the specified intensity thereby affecting the sensitivity of the sensor. In order to obtain sensors with the required sensitivity, the biasing forward current for each IR sensor LED can be adjusted or calibrated at the stage of production, as well as later during the sensor lifetime, such that the sensor provides the required or specified output signal for a given reference sensing environment.

Known sensor calibration techniques typically utilize complex calibration apparatus separate from the sensor to perform the necessary sensor calibration. Each individual sensor must therefore be temporarily connected to the calibration apparatus for calibration. Such production requirements therefore lead to increase in sensor manufacturing costs and time.

An alternative calibration technique utilizes a sensor calibration circuit which circuit includes a computer for the purpose of calculating the calibration co-efficient for sensor characterization based on complex algorithms specific to each type of sensor. The calibration apparatus has to be tailored to different types of sensors. Such a technique is both costly and complicated to implement in each individual sensor.

There is a need to provide a system and method of self-calibrating a sensor which can be implemented in a variety of sensors in a cost-effective manner.

The embodiments disclosed herein therefore directly address the shortcomings of conventional calibration systems and methods by providing an effective system and method of self-calibrating sensor that is suitable for many price sensitive applications.

BRIEF SUMMARY

It is therefore one aspect of the embodiments to provide for an improved system for self-calibrating a sensor.

It is another aspect of the embodiments to provide for an improved method of self-calibrating a sensor.

It is a further aspect of the embodiments to provide for a low cost self-calibrating sensor.

It is also another aspect of the embodiments to provide for a system of self-calibrating a sensor which can be implemented in a range of different types of sensors without substantial modifications.

The aforementioned aspects and other objectives and advantages can now be achieved as described herein.

In one aspect, a system for self-calibrating a sensor has a calibration circuit which compares an output signal of the sensor with a predetermined reference signal associated with a reference property and increments or decrements the sensor operating bias according to the deviation between the predetermined reference signal and sensor output signal such that the sensor output corresponds to the predetermined reference voltage. Advantageously, the calibration circuit can be implemented using low-cost circuit designs without providing circuitry for performing complex algorithms for sensor characterization, such as those for calculating calibration coefficients and transfer functions. Furthermore, the calibration circuit can be conveniently embedded in the sensor.

The calibration circuit has a bias controller for controlling a bias parameter of the sensor and a differential circuitry for comparing the predetermined reference signal with the sensor output signal and providing a control signal to the bias controller. The differential circuitry has a first input for receiving the sensor output signal, a second input for receiving the predetermined reference signal, and an output, coupled to the input of said bias controller.

A calibration switch operatively connected to the differential circuitry and/or the bias controller can switch the operating mode of the system between a calibration mode and a normal mode. The switch can be incorporated into the differential circuitry for switching the differential circuitry output between a calibration control signal and a normal mode control signal. The bias controller accordingly increments or decrements the operating bias in response to receiving the calibration control signal and the bias controller sets the operating bias at the calibrated value in response to receiving the normal mode control signal.

In use, the biasing controller, in response to receiving a control signal from the differential circuitry, can increment or decrement the operating bias point of the sensor according to the deviation to substantially eliminate the deviation between the predetermined reference signal and the sensor output signal such that the sensor output signal corresponds to the predetermined reference signal.

In another aspect, a self-calibrating sensor has a sensing device for sensing a measurand and a calibration circuit embedded in the sensing device. The calibration circuit has a bias controller, coupled to the sensing device, for controlling a bias parameter of the sensing device. The calibration circuit has differential circuitry having a first input, coupled to the output of said sensing device, for receiving the sensor output signal, a second input for receiving a predetermined reference signal associated with a reference property being measured by the sensor, and an output, coupled to the bias controller input. A calibration switch can be operatively connected to the differential circuitry and/or the bias controller for switching the operating mode of the system between a calibration mode and a normal mode.

The differential circuitry can have a comparator circuit coupled to a controller circuit for controlling the bias controller. The comparator circuit compares the sensor output signal with the predetermined reference signal and provides a feedback signal to the controller circuit, which in turn, provides a control signal to the bias controller.

When the self-calibrating sensor is operating in calibration mode, the biasing controller, in response to receiving a control signal from the differential circuitry, can increment or decrement the operating bias point of the sensor to substantially eliminate the deviation between the predetermined reference signal and the sensor output signal such that the sensor output signal is similar or equal to the predetermined reference signal. In normal mode, the sensing device can operate at the calibrated operating bias point.

The calibration circuitry can be implemented using digital logic circuits. The bias controller can be in the form of a digital potentiometer coupled to a bias source, such as a current or voltage source. The resistance value of the bias controller can be incremented or decremented in response to the control signal such that the bias source output biases the sensor accordingly. Alternatively, the bias controller can in the form of a pulse width modulator/demodulator coupled to a bias source. The pulse width of the modulator can be incremented or decremented in response to the control signal and the pulse width demodulator can provide an output to the bias source such that the bias source biases the sensor accordingly.

The calibration circuit can include calibration memory, such as non-volatile Electrically-Erasable Programmable Read-Only Memory (EEPROM), for storing the value of the calibration data.

In accordance with another aspect, a method of self-calibrating a sensor comprises arranging the sensor to sense a reference target material or other measurand, selecting an output signal of said sensor, selecting a predetermined reference signal associated with said reference material or other measurand, comparing said sensor output signal and said predetermined reference signal, determining the deviation between said sensor output signal and said predetermined reference signal, and incrementing or decrementing the operating bias point of said sensor according to said deviation until said deviation is substantially eliminated such that said sensor output signal and said predetermined reference signal are similar or equal.

The sensor can be an IR sensor and the reference target can comprise a Bar-code. Alternatively, for speed sensing applications, the sensor can comprise a Hall-effect/Magneto-resistive sensor and the reference target can comprise a Ferro-magnetic gear. In the case of proximity sensing, the sensor can be a Hall-effect/Magneto-resistive sensor and the reference target can comprise Ferro-magnetic material. In pressure cut-in/cut off sensing applications, the sensor can be a Piezo-Resistive Transducer and the reference target can comprise fluid/pneumatic pressure.

Additionally the method can include storing the operating bias point value when said sensor output signal corresponds to said predetermined reference signal, and setting the operating bias point of said sensor to said stored calibrated value as required.

The system and method of calibrating a sensor can be implemented in conjunction with any type of sensor which functions using a biasing signal.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION

Figure 1:
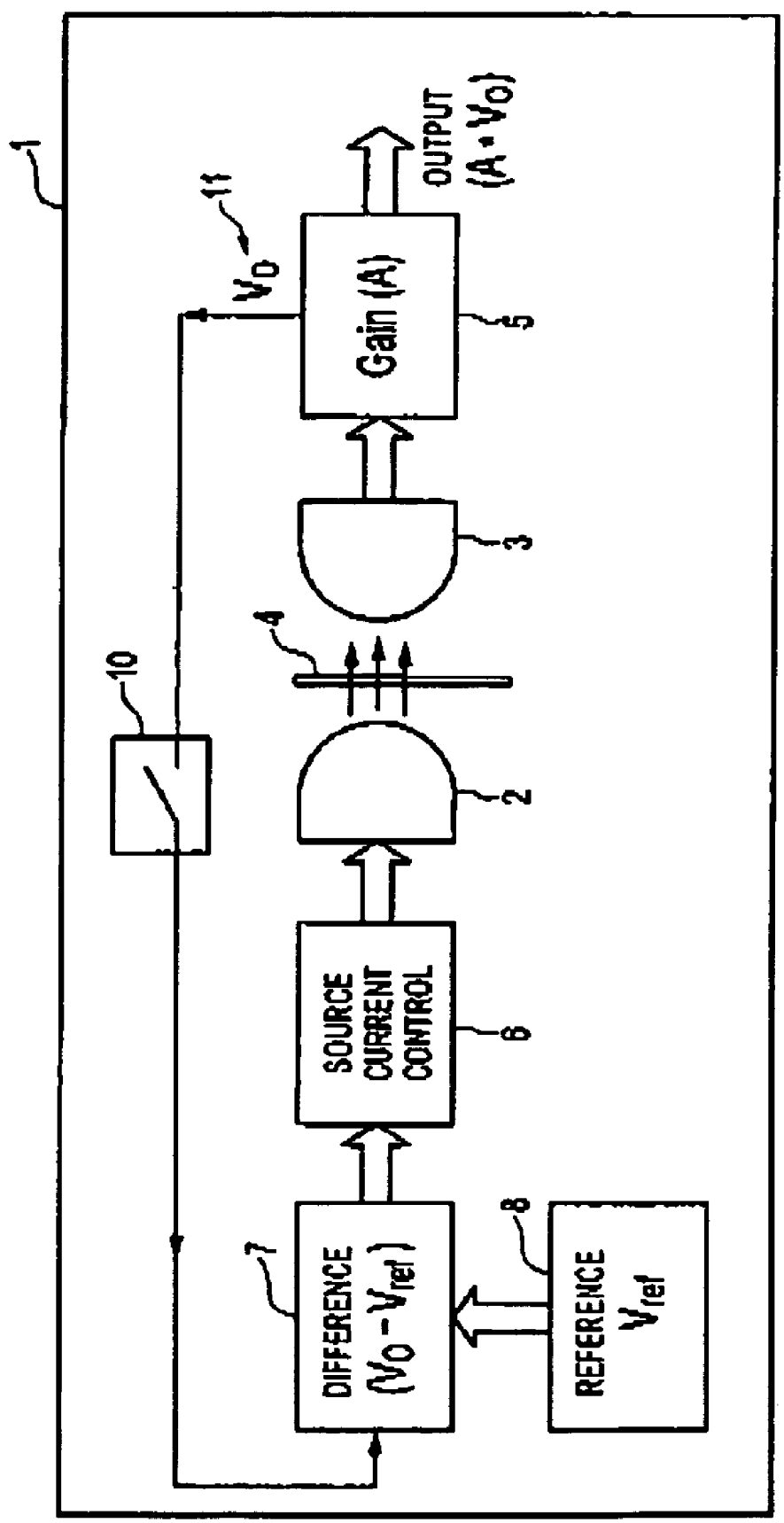
FIG. 1 illustrates a block diagram of a self-calibrating sensor in accordance with a preferred embodiment.

Referring to FIG. 1 of the accompanying drawings, which illustrates a block diagram of a self-calibrating sensor according to a preferred embodiment, the principle elements of the self-calibrating sensor 1 include a sensor transducer 2, 3, an amplifier 5, coupled to the output of the sensor transducer 3, and a self-calibrating circuit 6, 7, 10 coupled thereto for providing self-calibration of the sensor. An IR source 2, such as an IR LED and an associated photodetector 3, such as a phototransistor, form the sensor transducer. The self calibrating system has a differential circuitry 7, a biasing controller/source 6, coupled to the output of the differential circuitry 7 and the input of the sensor transducer 2, and a calibration switch 10 interposing an output of the sensor transducer and the input of the differential circuitry 7.

The illustrative embodiment depicted in FIG. 1 provides a general approach to providing a self-calibration sensor which can perform self-calibration in an efficient and cost-effective manner without the use of complex algorithms for sensor characterization by calculating calibration co-efficient. Those skilled in the art would understand that the illustration of FIG. 1 is merely depicting one example of the embodiments and that the embodiments are not limited thereto. As will be discussed in more detail below, the circuitry of the self-calibrating system can be implemented in a variety of different modes. Furthermore, the self-calibrating system can be easily applied to any types of sensors which operate using a biasing signal, such as for example, Hall-Effect sensors, Magneto-Resistive sensors or piezo-resistive pressure sensors and is not limited to the optical sensor illustrated in the embodiment depicted in FIG. 1.

Figure 2:
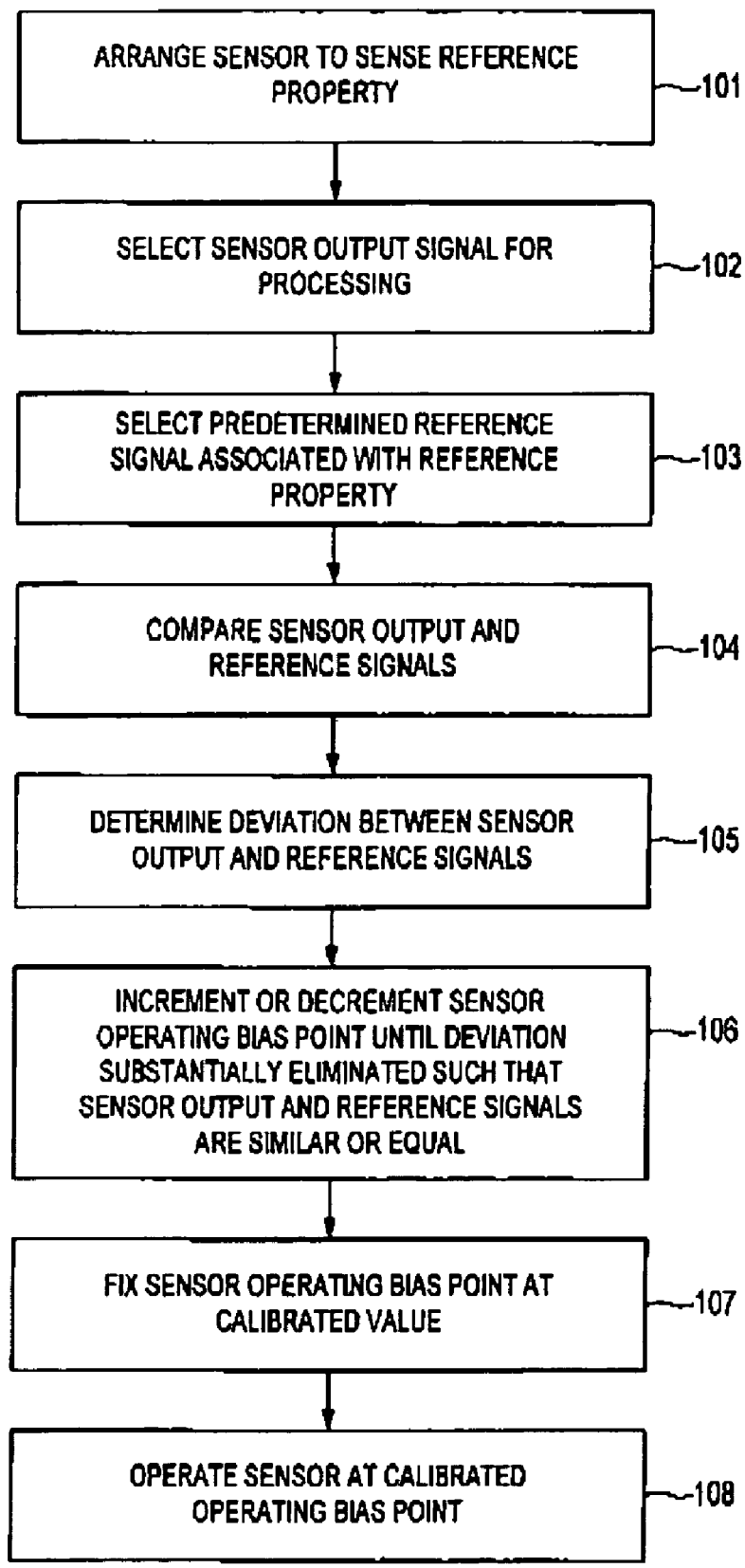
FIG. 2 illustrates flow-diagram outlining the steps of self-calibrating a sensor in accordance with an embodiment.

FIG. 2 illustrates a flow-diagram outlining the steps of calibrating a sensor using the self-calibration circuit shown in FIG. 1. Initially, the sensor is arranged to sense a reference property (step 101 of FIG. 2). For example, in the case of the optical sensor 2, 3 shown in FIG. 1, the reference property can be a reference target material 4, such as a standard quality paper, positioned between the IR source 2 and the photodetector 3. The calibration mode of the system is activated by selecting the sensor output signal for processing (step 102 of FIG. 2). This is achieved in the self-calibrating sensor of FIG. 1 by closing the calibration switch 10 such that the output voltage 11 of the photodetector 3 is fed back to the differential circuitry 7. A predetermined reference signal associated with the reference property is selected (step 103 of FIG. 2). For example, if the reference target 4 causes a 50% reduction in the IR source beam intensity received at the detector 3, the value of the reference voltage 8 (Vref) is selected to correspond to the required specified output signal of the detector for detecting a 50% reduction in the beam.

The actual sensor output selected for processing is then compared to the predetermined reference signal (step 104 of FIG. 2) and the deviation between the sensor output signal and the reference signal is determined (step 105 of FIG. 2).

In the example of FIG. 1, this achieved by means of the differential circuitry 7 which compares the sensor output voltage 11 ($V_o$) and the reference voltage 8 ($V_{ref}$). The operating bias point of the sensor is then incremented or decremented by the bias control source 6 according to whether the deviation between the output and reference signals is negative or positive, i.e. according to the deviation polarity, to thereby increase or decrease the sensor output signal until the deviation between the actual sensor output signal and the predetermined reference signal is substantially eliminated such that the actual output signal corresponds to the reference signal (step 106 of FIG. 2).

In the example depicted in FIG. 1, the biasing control source 6 increments or decrements the biasing current of the IR source according to the output of the differential circuitry 7 until the actual output voltage 11 equals or is similar to the reference voltage 8 associated with the reference target 4 so that the detector output voltage corresponds to the required specified output signal for a 50% reduction in the IR source beam.

Thereafter, the normal operating mode of the sensor is activated by fixing the sensor operating bias point at the resulting calibrated value (step 107 of FIG. 2). In the example of FIG. 1, this is achieved by opening the calibration switch 10 thereby preventing any further feedback of the detector output signal to the differential circuitry 7 so that the biasing source holds the operating bias of the IR source 2 at the calibrated operating point. The sensor is then operated at the calibrated operating bias point as indicated in step 108 of FIG. 2.

The self-calibrating sensor of FIG. 1 can be calibrated in a variety of applications. For example, if the self-calibrating sensor is to be used for the purpose of detecting paper quality or quantity, in calibration mode, a standard quality paper is inserted between the source and detector to serve as the reference target. The predetermined reference signal or threshold is selected so that the light intensity detected by the detector provides the specified sensor output. For example, if the reference voltage is 2.5 V, after calibration, the source will provide a beam having a light intensity such that the detector output for that particular quality paper would be 2.5V.

In paper or bar code sensing applications, the amount of light that the source is designed to provide therefore defines the reference voltage. The reference voltage is selected such that the detector will operate in the active region. In normal operation mode, the sensor system can be utilized to detect paper quality or different quantities of paper. If any low quality paper is placed between the source and detector, the beam will be affected by the low quality paper differently compared with standard quality paper resulting in a small change in the beam intensity at the detector compared with the standard paper.

Because the detector has been calibrated to operate in the active region, the small change in beam intensity causes a measurable shift in the output signal of the detector, in this case the output voltage, from the reference signal, say 2.5V +δV. This small change can be used to sense any low quality paper. Furthermore, if more than one paper is placed between the source and detector, the beam intensity at the detector will be less than in the case in which a single paper is placed therebetween. This will cause a change in the output voltage of the detector from the reference voltage say 2.5−δV.

The self-calibrating sensor of FIG. 1, can therefore be calibrated to any material quality (semitransparent to light or IR). Since the detector is calibrated to operate in the active region, small discrete changes in light intensity can be detected.

In the case of a proximity/position sensing application, the air gap between the target and sensing element will define the predetermined reference signal or threshold. In speed sensing applications, the reference signal or threshold will be defined by the air gap between the sensing element and the gear tooth. In pressure switch applications, the reference signal or threshold is defined by the cut-on/cut-off pressure.

As the method relies on dynamically calibrating the sensor to the predetermined reference signal or threshold, self-calibration can be implemented efficiently and rapidly on any type of sensor without the use of complicated algorithm calculations associated with particular types of sensors. The self-calibrating sensor can therefore be fabricated without tailoring the algorithms and associated components for each type of sensor making manufacture of the system more cost effective and less time consuming. Additionally, the calibration method can be more easily implemented in circuit designs which can be embedded in the sensor in a cost-effective manner. Furthermore, the self-calibrating system shown in FIG. 1 can be used in conjunction with different types of sensors without making substantial modifications. All that is required is to provide the appropriate type of reference signal and control bias according to the sensor operating characteristics.

Figure 3:
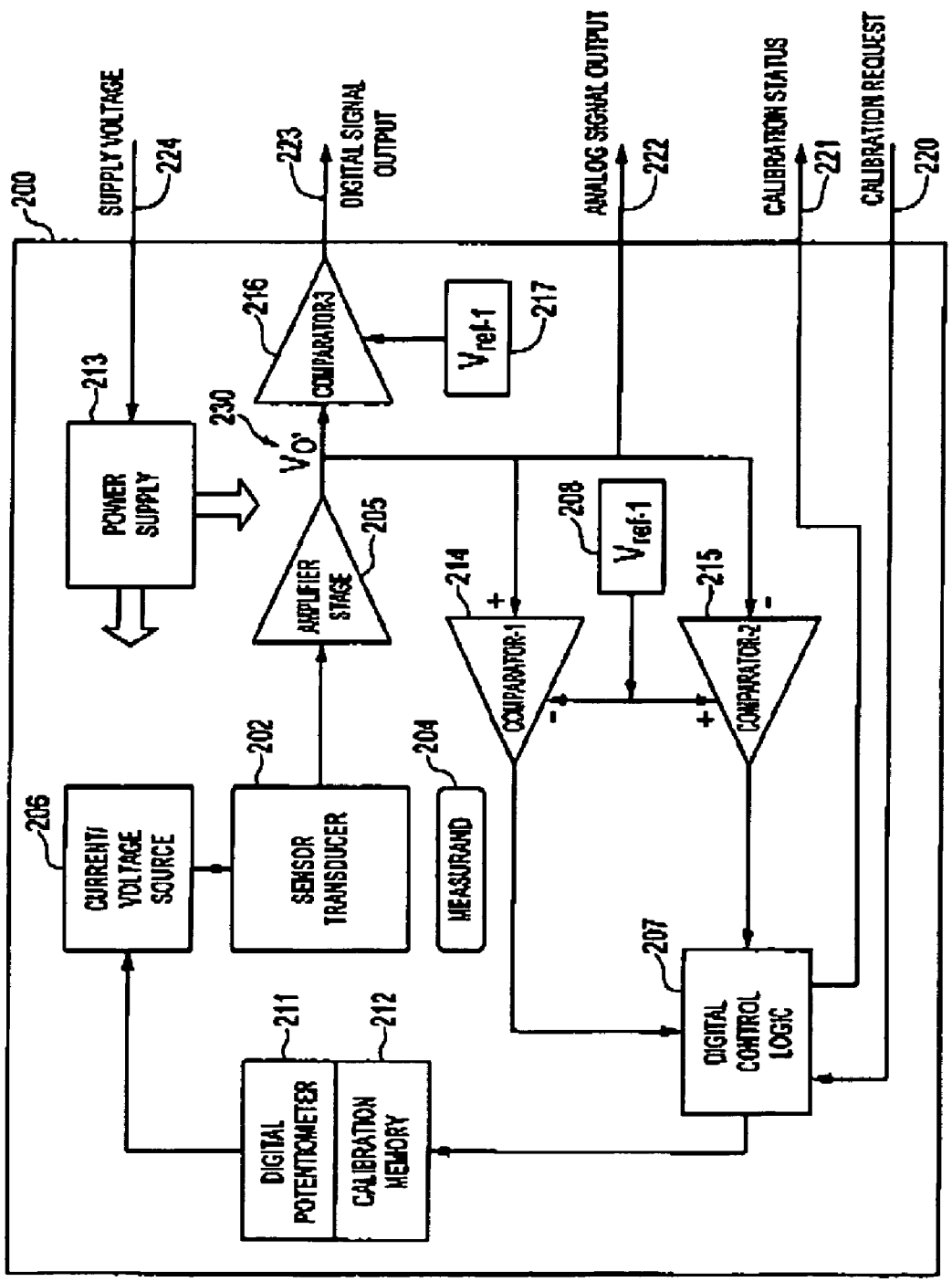
FIG. 3 illustrates a block diagram of a self-calibrating sensor in accordance with another embodiment.

The method and system of self-calibrating the sensor can be implemented using a variety of calibration circuit designs. One such circuit is a digital potentiometer type circuit as shown in FIG. 3 which illustrates a self-calibrating sensor 200 according to another embodiment. In this particular embodiment, the sensor transducer 202 for sensing a measurand 204 has an output electrically coupled to an amplifier 205, which in turn, is electrically coupled to the input of a comparator circuit 214, 215 for comparing the amplified sensor output voltage 230 (Vo') to a reference voltage 208 (Vref−1). The comparator circuit can be realized for example by means of a pair of op-amplifiers 214, 215 arranged in a complementary mode as is known by those skilled in the art. The output of the amplifier 205 provides an analogy signal output 222 and is also electrically coupled to the input of another comparator 216 for comparing the output voltage 230 to a voltage reference 217 (Vref−2) to thereby provide a digital signal output 223.

A digital logic controller 207 is electrically coupled to the output of the comparator 214, 215 and the input of a digital potentiometer 211, which potentiometer in turn, is electrically coupled to a biasing current/voltage source 206 for biasing sensor transducer 202. The controller 207 has logic circuitry which is arranged to increment or decrement the resistance value of the digital potentiometer 211 when the controller is triggered by a negative or positive comparator output. The logic controller has additional inputs/outputs for connecting with a calibration request line 220 and status signal line 221. A non-volatile calibration memory 212, such as an EEPROM, is electrically coupled to the digital potentiometer and the logic controller circuitry. A power supply 213 receiving a supply voltage 224 provides electrical power to the respective elements of the sensor circuit.

In order to switch the self-calibrating sensor 200 into calibration mode, the digital logic controller calibration request 220 is enabled causing the controller to provide a control signal to the digital potentiometer based on the comparator circuit 214,215 output. The output of the comparator circuit 214 approaches Logic High and comparator circuit 215 output approaches Logic Low when the sensor output voltage 230 applied to the comparator input is slightly greater than the reference voltage 208 (Vref–1). When the output voltage 230 is slightly less than the reference 208, the comparator circuit 214 output approaches Logic Low whereas the comparator circuit 215 approaches Logic High.

The logic controller 207 increments or decrements the resistance value of the potentiometer 211, which in turn, changes the output of the biasing current/voltage source 206 increasing or decreasing the sensor output voltage 230 until the output voltage 230 finally reaches the voltage reference 208. For example, in the case of an IR sensor, Magneto-Resistive sensor or Hall-effect sensor, the biasing source 206 adjusts the forward bias current through the IR LED, Magneto-Resistive transducer or Hall-effect transducer respectively. If a piezo resistive pressure sensor is used as the sensor, the biasing source comprises a voltage/current source and the bias point is adjusted by adjusting the bias voltage/current to bridge resistors coupled to the sensor transducer.

When the output voltage 230 corresponds to or is slightly more than the voltage reference 208 the deviation therebetween is effectively eliminated and the polarity of the comparator output switches. The logic controller 207 consists of digital comparator inputs coupled to output of comparator 214 and comparator 215, when output voltage 230 equals voltage reference 208, the output of both the comparators 214,215 approaches logic low. The logic controller 207 detects this as an indication that the calibration process is complete. In response, the logic controller 207 sends a flag signal to the calibration memory 212, to store the digital potentiometer resistance value and enables the calibration status line 221 indicating that the calibration process has terminated and that the sensor can now operate in normal mode.

In the event that the self-calibrating sensor 200 is powered down, the digital potentiometer calibrated resistance value is retained in the calibration memory 212 such that on re-powering up the sensor, the digital potentiometer resistance value is set to the calibrated value thereby maintaining the sensor operating point at the calibrated value irrespective of a loss of power.

Figure 4:
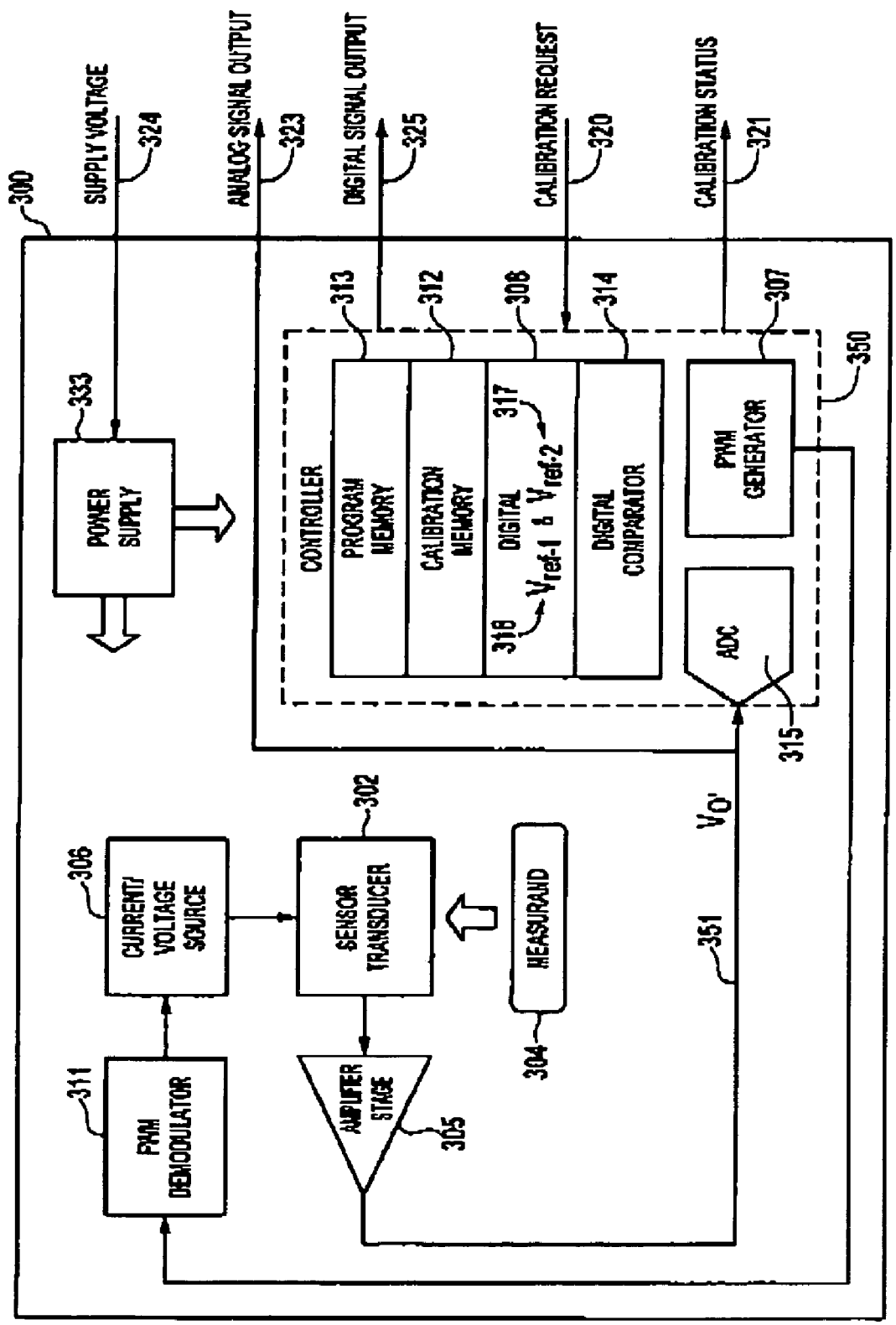
FIG. 4 illustrates a block diagram of a self-calibrating sensor in accordance with yet another embodiment.

Another type of calibrating circuit suitable for implementing the system and method for self-calibrating the sensor is the pulse width modulation circuit, as shown in FIG. 4, which illustrates a block diagram of a self-calibrating sensor according to yet another embodiment. In this particular embodiment, the sensor 302 for sensing a measurand 304 has an output electrically coupled to an amplifier 305, which in turn, is electrically coupled to an analogue voltage output 323 and an input to a controller 350.

The controller includes an analogue to digital converter 315 for converting the analogue output voltage 351 of the sensor transducer 302 to digital data, a digital comparator 314 for comparing the digital data with the predetermined voltage references 308 which are predetermined voltage 318 (Vref–1) and predetermined voltage 317 (Vref–2), program memory 313 such as non-volatile Flash/EPROM, for storing the set of instructions to control the PWM generator 350, Digital Comparator 314 and digital reference voltage 318, 317, and calibration memory 312, such as a non-volatile EEPROM, for storing calibration data and a pulse width modulator 307 for generating a modulated alternating signal. The controller 350 has a digital signal output 325.

Additional inputs/outputs can be respectively connected to calibration request line 320 and calibration status line 321. A pulse width demodulator 311, for generating an output with a value corresponding to the value of the pulse width of the alternating signal received from the pulse width modulator, is electrically coupled to the biasing current/voltage source 306, which in turn, is electrically coupled to an input of the sensor transducer 302. A power supply 333 receiving supply voltage 324 provides electrical power to the respective elements of the sensor 300.

Implementing the calibration circuit in the pulse width modulation circuit is particularly cost-effective because the comparator circuit, logic controller, calibration memory, pulse width modulator and other circuitry can be incorporated into a single-chip controller.

In order to switch the sensor 300 into calibration mode, the calibration request 320 is enabled causing the pulse width modulator 307 to generate modulated alternating signal which is coupled to pulse width demodulator for generating output proportional to pulse width of alternating signal, which in turn changes the biasing current/voltage source 306, increasing or decreasing the sensor transducer 302 output voltage 351. The amplified sensor output voltage 351 is converted into digital data by the converter 315 and compared to the digital reference 318 (Vref–1) by the digital comparator 314.

A negative or positive output from the digital comparator 314 triggers the pulse width modulator 307 causing the pulse width of the alternating signal to increase or decrease until the output provided by the pulse width demodulator to the biasing current/voltage source 306 is sufficient to cause the output voltage 351 to reach the predetermined reference voltage 318. Thereafter, the controller 350 detects that the digital data from the converter is the same as reference 318 (Vref–1) and stores data representing the pulse width of the generated alternating signal in the calibration memory 312.

The sensor transducer 302 is held at the set operating point by means of the biasing source 306 even in the event of powering up the sensor 300 following powering down by virtue of the calibrated pulse width data being stored in the calibration memory and re-applied to the pulse width generator 307 on power-up. The calibration status line 321 is then enabled-to indicate that the calibration process is complete and that the sensor 300 can be used in normal mode.

It will be appreciated that variations of the above-disclosed and other features, aspects and functions, or alternatives thereof, may be desirably combined into many other different systems or applications. Also, it will be appreciated that various presently unforeseen or unanticipated alternatives, modifications, variations or improvements therein may be subsequently made by those skilled in the art which are also intended to be encompassed by the following claims.

What is claimed is:

1. A self-calibrating sensor comprising
a piezo-resistive pressure sensor, and
a calibration circuit comprising
    a bias controller, coupled to an input of said a piezo-resistive pressure sensor, for adjusting a bias parameter of the a piezo-resistive pressure sensor,
    differential circuitry having a first input for receiving an output signal of said piezo-resistive pressure sensor, a second input for receiving a predetermined reference signal, and an output, coupled to an input of said bias controller, for providing a control signal according to the deviation between said predetermined reference signal and said output signal, and a calibration switch operatively connected to said differential circuitry and/or said bias controller for switching the operating mode of the system between a calibration mode and a normal mode, whereby, in calibration mode, said biasing controller, in response to receiving said control signal, can increment or decrement the operating bias point of the piezo-resistive pressure sensor by adjusting the bias voltage/current to bridge resistors connected thereto to substantially eliminate said deviation thereby providing a sensor output signal corresponding to said predetermined reference signal, and whereby, in normal mode, said piezo-resistive pressure sensor can operate at the calibrated operating bias point.

2. The system as claimed in claim 1, wherein said calibration circuit is embedded in said piezo-resistive pressure sensor.

3. The system as claimed in claim 2, where said calibration circuit is formed from digital logic circuitry.

4. The system as claimed in claim 3, wherein said differential circuitry comprises a comparator circuit, having at least one input coupled to said sensor output and at least one input for receiving said predetermined reference signal, said comparator circuit comparing said sensor output and said predetermined reference signal, and a digital logic controller having at least one input coupled to at least one output of said comparator circuit and having an output coupled to an input of said bias controller, said digital logic control providing said control signal to said bias controller.

5. The system as claimed in claim 4, wherein said digital logic controller further comprises a calibration request input, said calibration switch being operable to connect the output of said digital logic controller to said bias controller input in response to said calibration request input being enabled to thereby switch the operating mode of said sensor system to calibration mode and being operable to disconnect the digital logic controller output in response to said calibration request input being disabled to thereby switch the operating mode of said sensor system to said normal mode.

6. The system as claimed in claim 4, wherein said bias controller comprises a digital potentiometer, said digital potentiometer incrementing or decrementing in value according to said control signal, and a biasing source interposing said digital potentiometer and said piezo-resistive pressure sensor for biasing said piezo-resistive pressure sensor according to the value of said potentiometer.

7. The system as claimed in claim 4, wherein said calibration circuit further comprises a calibration memory, coupled to said bias controller, for storing calibration data representing the bias controller setting required to calibrate the piezo-resistive pressure sensor, said calibration memory being applied to said bias controller upon power-up of said calibration circuit and/or said piezo-resistive pressure sensor such that said bias controller, sets the operating point of said piezo-resistive pressure sensor according to the pre-calibrated operating point.

8. The system as claimed in claim 4, wherein said digital logic controller further includes a calibration status output for providing a calibration status signal indicating that the calibration process has terminated and that the sensor can now operate in normal mode in response to said sensor output signal corresponding to said predetermined reference input.

9. The system as claimed in claim 4, wherein said bias controller comprises a pulse width modulation generator coupled to said digital comparator for providing an alternating signal, said pulse width modulation generator incrementing or decrementing the pulse width of said alternating signal according to the deviation between said digital data representing said piezo-resistive pressure sensor output and said predetermined digital reference, a pulse width demodulator, interposing the output of said pulse width modulator, and a biasing source, coupled to said piezo-resistive pressure sensor, for providing a biasing signal to said piezo-resistive pressure sensor corresponding in value to the pulse width of said alternating signal.

10. The system as claimed in claim 4, wherein said digital comparator, said logic controller and said pulse width modulator are incorporated into a single main controller, said main controller having a program memory for storing a set of instructions to control the pulse width modulator.

11. A method of self-calibrating a piezo-resistive pressure sensor comprising arranging said a piezo-resistive pressure sensor to sense a reference material or other mesurand, converting an output signal of said a piezo-resistive pressure sensor to digital data, selecting a predetermined reference signal associated with said reference material or other measurand, comparing said digital data and said predetermined reference signal, generating a control signal according to the deviation between said piezo-resistive pressure sensor output signal and said predetermined reference signal, pulse width modulating on an alternating signal according to said control signal, pulse width demodulating said pulse width modulated alternating signal, and adjusting the voltage/current to bridge resistors connected to said piezo-resistive pressure sensor according to the value of said pulse width demodulated signal to thereby increment or decrement the operating bias point of said piezo-resistive pressure sensor until said deviation is substantially eliminated such that said piezo-resistive pressure sensor output signal and said predetermined reference signal are similar or equal.

12. The method as claimed in claim 11, further comprising storing the operating bias point value when said piezo-resistive pressure sensor output signal corresponds to said predetermined reference signal, and setting the operating bias point of said piezo-resistive pressure sensor to said stared calibrated value.

13. A self-calibrating sensor comprising a piezo-resistive pressure sensor, and a calibration circuit embedded in said piezo-resistive pressure sensor, said calibration circuit comprising a bias controller, coupled to an input of said a piezo-resistive pressure sensor, for adjusting a bias parameter of the a piezo-resistive pressure sensor, differential circuitry having a first input for receiving an output signal of said piezo-resistive pressure sensor, a second input for receiving a predetermined reference signal, and an output, coupled to an input of said bias controller, for providing a control signal according to the deviation between said predetermined reference signal and said output signal, and a calibration switch operatively connected to said differential circuitry and/or said bias controller for switching the operating mode of the system between a calibration mode and a normal mode, whereby, in calibration mode, said biasing controller, in response to receiving said control signal, can increment or decrement the operating bias point of the piezo-resistive pressure sensor by adjusting the bias voltage/current to bridge resistors connected thereto to substantially eliminate said deviation thereby providing a sensor output signal corresponding to said predetermined reference signal, and whereby, in normal mode, said piezo-resistive pressure sensor can operate at the calibrated operating bias point.

14. The self-calibrating sensor of claim 13, wherein said bias controller comprises a pulse width modulation generator, coupled to said digital comparator, for providing an alternating signal, said pulse width modulation generator incrementing or decrementing the pulse width of said alternating signal according to said control signal, a pulse width demodulator, coupled to said digital comparator, for providing an output corresponding to the width of said alternating signal, and a biasing source, coupled to said piezo-resistive pressure sensor, for providing a biasing signal to said to bridge resistors corresponding in value to said output of said pulse width demodulator.

15. The self-calibrating sensor as claimed in claim 14, wherein said differential circuitry comprises an analogue to digital converter for converting said piezo-resistive pressure sensor output to digital data, and a digital comparator coupled to said digital converter for comparing the digital data to a predetermined digital reference.

16. The self-calibrating sensor as claimed in claim 13, wherein said differential circuitry comprises a comparator circuit, having inputs coupled to said sensor output and for receiving said predetermined reference signal, said comparator circuit comparing said sensor output and said predetermined reference signal, a digital logic controller having at least one input coupled to at least one output of said comparator circuit and having an output coupled to an input of said bias controller, said digital logic control providing said control signal to said bias controller, and wherein said bias controller comprises a digital potentiometer, said digital potentiometer incrementing or decrementing in value according to said control signal, and a biasing source interposing said digital potentiometer and piezo-resistive pressure sensor for biasing said piezo-resistive pressure sensor according to the value of said potentiometer.

17. The self-calibrating sensor as claimed in claim 13, wherein said calibration circuit further comprises of non-volatile memory for storing calibration data representing the bias controller setting required to calibrate said operating point of said piezo-resistive pressure sensor, said calibration data being stored in said memory when said system is powered down and being re-applied to said bias controller on re-powering up said system.

* * * * *

UNITED STATES PATENT AND TRADEMARK OFFICE
CERTIFICATE OF CORRECTION

PATENT NO.         : 7,289,924 B2                                Page 1 of 1
APPLICATION NO.    : 11/185036
DATED              : October 30, 2007
INVENTOR(S)        : Raghavendra Muniraju et al.

It is certified that error appears in the above-identified patent and that said Letters Patent is hereby corrected as shown below:

In Column 10, line 55, delete "stared" and add --stored--.

Signed and Sealed this

Eighth Day of April, 2008

JON W. DUDAS
*Director of the United States Patent and Trademark Office*